No. 654,126. Patented July 24, 1900.
E. BEGHTEL.
HEDGE FENCE.
(Application filed Feb. 23, 1900.)
(No Model.)
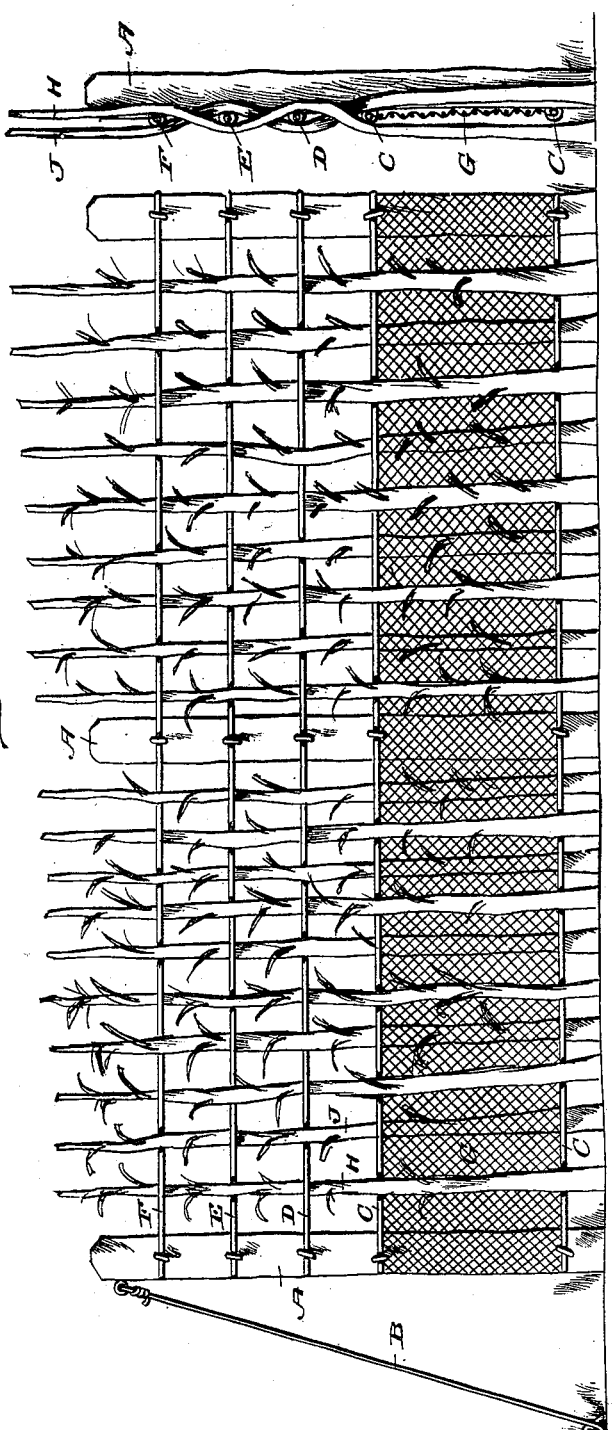
Witnesses
Inventor
Eli Beghtel
By David P. Moore.
Atty.

UNITED STATES PATENT OFFICE.

ELI BEGHTEL, OF HUNTINGTON, INDIANA.

HEDGE FENCE.

SPECIFICATION forming part of Letters Patent No. 654,126, dated July 24, 1900.

Application filed February 23, 1900. Serial No. 6,232. (No model.)

*To all whom it may concern:*

Be it known that I, ELI BEGHTEL, a citizen of the United States, residing at Huntington, in the county of Huntington and State of Indiana, have invented certain new and useful Improvements in Hedge Fences, of which the following is a specification.

My invention relates to improvements in hedge fences; and the main object of my invention is the provision of a very serviceable and practical hedge fence.

To attain the desired objects, the invention consists of a hedge fence embodying novel features of construction and combination of parts, substantially as disclosed herein.

In the drawings, Figure 1 is a side elevation of a fence constructed in accordance with and embodying my invention. Fig. 2 is a vertical section taken through the fence about midway between the posts.

Referring by letter to the drawings, A designates the fence-posts, the end one of which is braced by the brace B. Stretched from post to post are the two lower strands C and the three upper parallel strands or wires D, E, and F. The strands C are passed between the hedge trees near the ground, and the wire-netting G is put between the same and connected to the strands, thus making the strands support and stretch the hedging or netting. Now the hedge tree H is allowed to be upon the outside of the netting, but back of the strand D in front of the strand E and back of the strand F, each alternate tree having the same course and position, while the next tree J has its lower portion back of the netting, then in front of the strand D, back of the strand E, and in front of the strand F, each alternating tree having the same course and position. Thus it will be seen that the netting and its supporting-wires form a small animal-tight fence at the bottom even should all the branches fall off from the lower portion of the trees, while the upper strands are so interwoven with the trees as to form a strong and durable fence which will protect and support the hedge, as well as turn large animals.

To construct my fence, the hedge trees are planted in two rows, the trees being arranged alternating, as shown and described. The fence-posts are then planted and the wires are strung from post to post between the rows of trees. The wire-netting is then secured to the two lower parallel wires, and the hedge trees are then interwoven, as they grow, with the upper parallel wires, as described and shown, thus constructing a very useful and practical hedge fence.

From the foregoing description, taken in connection with the drawings, it will be seen that I provide a very simple, durable, and cheap hedge fence which will be adapted to turn any-sized animals and whose parallel wires are adapted to support and train the hedge trees, while the lower wires and netting are unaffected by the growth of the trees.

I claim—

1. A hedge fence, consisting of two rows of trees arranged alternately; posts located in line with one of the rows; and a series of parallel fence-wires stretched along the posts in the space between the rows, the two lower wires carrying a netting, and the upper wires passing alternately in and outside of the trees' stems in the manner shown and described.

2. A hedge fence, consisting of the hedge trees, two lower parallel strands of wire carrying a netting located in the space between the trees, a series of fence or supporting wires above the lower wires and interwoven with the trees so that each other tree is passed upon the opposite sides of successive wires, and also on the opposite side from its neighboring trees.

In testimony whereof I affix my signature in presence of two witnesses.

ELI BEGHTEL.

Witnesses:
M. W. MOORE,
ALBERT WARD.